United States Patent
Zhang et al.

(10) Patent No.: US 9,729,905 B2
(45) Date of Patent: Aug. 8, 2017

(54) METHOD AND SYSTEM FOR EFFICIENT DIGITAL VIDEO TRANSMISSION USING BONDED GROUPS OF CHANNELS

(71) Applicant: Avago Technologies General IP (Singapore) Pte. Ltd., Singapore (SG)

(72) Inventors: Weimin Zhang, San Jose, CA (US); Binfan Liu, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 39 days.

(21) Appl. No.: 14/812,531

(22) Filed: Jul. 29, 2015

(65) Prior Publication Data

US 2017/0034544 A1  Feb. 2, 2017

(51) Int. Cl.
| | |
|---|---|
| H04N 21/236 | (2011.01) |
| H04N 21/2365 | (2011.01) |
| H04N 21/2368 | (2011.01) |
| H04N 21/2385 | (2011.01) |
| H04N 21/442 | (2011.01) |
| H04N 21/647 | (2011.01) |
| H04N 21/222 | (2011.01) |
| H04N 21/2343 | (2011.01) |
| H04N 21/2383 | (2011.01) |

(52) U.S. Cl.
CPC ..... *H04N 21/2365* (2013.01); *H04N 21/2221* (2013.01); *H04N 21/2383* (2013.01); *H04N 21/2385* (2013.01); *H04N 21/234309* (2013.01)

(58) Field of Classification Search
None
See application file for complete search history.

(56) References Cited

U.S. PATENT DOCUMENTS

| | | | | |
|---|---|---|---|---|
| 2007/0097907 | A1* | 5/2007 | Cummings | H04L 49/90 370/329 |
| 2011/0030019 | A1* | 2/2011 | Ulm | H04N 7/17318 725/98 |
| 2011/0154425 | A1* | 6/2011 | Kim | H04N 21/2385 725/116 |
| 2012/0054312 | A1* | 3/2012 | Salinger | H04L 65/1089 709/219 |
| 2012/0147751 | A1* | 6/2012 | Ulm | H04L 12/2801 370/237 |
| 2013/0219435 | A1* | 8/2013 | Pattison | H04N 21/4383 725/68 |

* cited by examiner

*Primary Examiner* — Brian T Pendleton
*Assistant Examiner* — Jean D Saint Cyr
(74) *Attorney, Agent, or Firm* — Sterne, Kessler, Goldstein & Fox P.L.L.C.

(57) ABSTRACT

The present disclosure is directed to a system and method for creating overlapping bonded groups of downstream channels that can provide increased channel capacity to improve packing densities, while at the same time limiting complexity and cost increases of new receivers and allowing the continued operation of legacy receivers.

20 Claims, 5 Drawing Sheets

METHOD AND SYSTEM FOR EFFICIENT DIGITAL VIDEO TRANSMISSION USING BONDED GROUPS OF CHANNELS

TECHNICAL FIELD

This application relates generally to digital video transmission, including digital video broadcast.

BACKGROUND

Digital cable television providers broadcast television programs to subscribers over channels that are six MHz wide in North America and eight MHz wide in Europe. Before being broadcast, the data of a television program is compressed and modulated, typically using 64 or 256 quadrature amplitude modulation (QAM).

Using 256 QAM, a six MHz wide channel can provide an approximate transmission rate of 39 Mbps under normal noise conditions, which is enough capacity to support the transmission of several standard-definition television (SDTV) programs and/or high-definition television (HDTV) programs. With the introduction of improved video compression technologies, such as High Efficiency Video Encoding (HEVC) or H.265, the approximate 39 Mbps channel capacity can even support the transmission of one ultra high-definition television (UHDTV) program. For example, a 4K UHDTV program at 60 frames/sec and 10 bits/pixel compressed using HEVC requires an average data rate of about 25 Mbps, which can fit within the 39 Mbps capacity of the six MHz wide channel using 256 QAM.

One issue encountered using this basic transmission scheme is that, after packing one or more compressed and modulated broadcast television programs into a channel, there is often left over channel capacity that is wasted because it is too small to accommodate the transmission of another compressed and modulated broadcast television program. As UHDTV formats become ubiquitous, there is an enormous amount of additional video bits that need to be compressed and transported, making increased utilization of this left over channel capacity desirable.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" or "subsystem" shall be understood to include software, firmware, or hardware (such as one or more circuits, microchips, processors, and/or devices), or any combination thereof. In addition, it will be understood that each module or subsystem can include one, or more than one, component within an actual device, and each component that forms a part of the described module or subsystem can function either cooperatively or independently of any other component forming a part of the module. Conversely, multiple modules or subsystems described herein can represent a single component within an actual device. Further, components within a module or subsystem can be in a single device or distributed among multiple devices in a wired or wireless manner.

1. Overview

To improve the packing density of broadcast television programs within a channel of a cable network, the capacity of the channel can be increased to allow additional broadcast television programs to be transmitted. The improvement in packing density can result from the channel capacity being more close to the sum capacity requirement of the broadcast television programs within the channel (such that the broadcast television programs fit more "tightly" within the channel) and/or from an increase in a statistical multiplexing gain that allows one or more additional broadcast television programs to be inserted into the channel.

Figure 1:
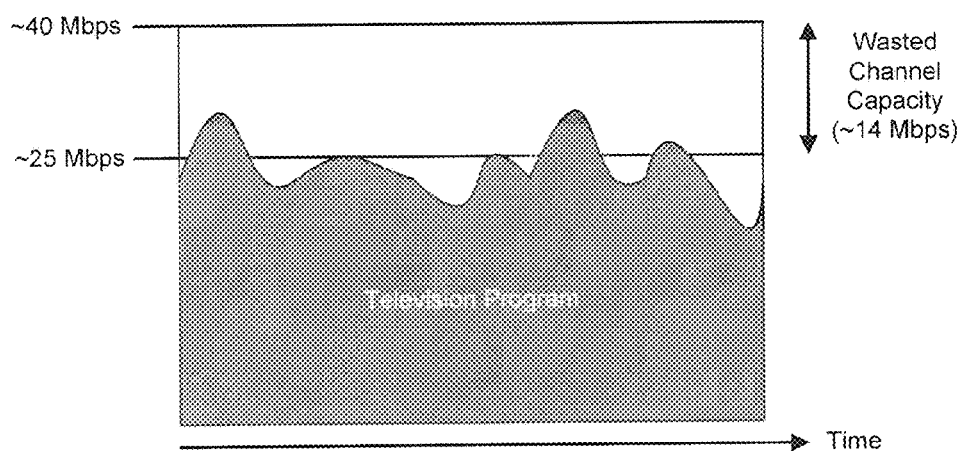
FIG. 1 illustrates an example channel capacity occupied by a compressed and modulated broadcast television program.

For example, FIG. 1 illustrates an approximate 40 Mbps channel capacity 100 of a six MHz wide downstream channel using 256 QAM under typical noise conditions. The channel capacity 100 is filled with a compressed broadcast television program formatted in accordance with a 4K UHDTV format at 60 frames/sec and 10 bits/pixel. As can be seen from FIG. 1, the compressed broadcast television program has a variable bit rate with an average bit rate around 25 Mbps. The channel capacity 100 has insufficient left over capacity to carry another, similarly formatted broadcast television program. As a result, around 14 Mbps of the channel capacity 100 may be wasted.

Figure 2:
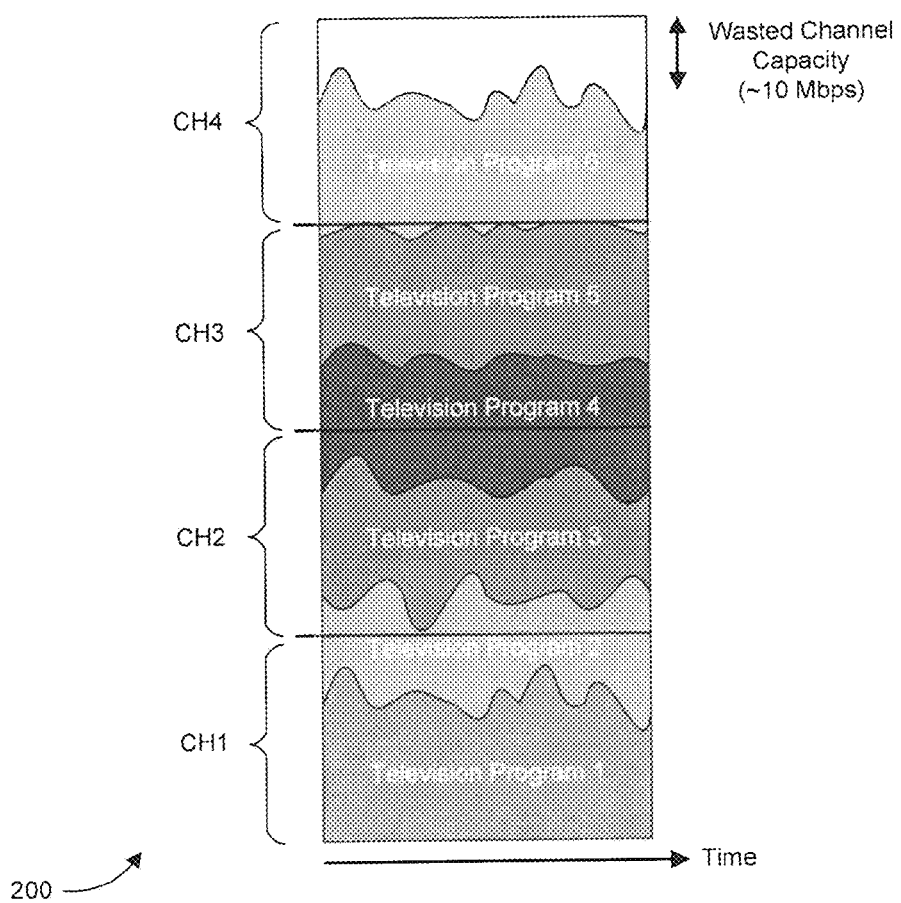
FIG. 2 illustrates an example capacity of a bonded group of channels occupied by compressed and modulated broadcast television programs in accordance with embodiments of the present disclosure.

FIG. 2 illustrates an approximate 160 Mbps bonded channel capacity 200 of four, six MHz wide downstream channels (CH1-CH4). Bonded channel capacity 200 results from "bonding" the four downstream channels, each of which has an approximate 40 Mbps capacity at 256 QAM under typical noise conditions, such that the four downstream channels operate like a single, logical downstream channel. As compared to channel capacity 100 of a single channel shown in FIG. 1, which can accommodate one compressed broadcast television program formatted in accordance with a 4K UHDTV format at 60 frames/sec and 10 bits/pixel using 256 QAM, bonded channel capacity 200 can carry six similarly compressed and formatted broadcast television programs. In other words, using only four times the bandwidth, bonded channel capacity 200 of the four downstream channels can carry six times the number of broadcast television programs as channel capacity 100.

The improvement in packing density results from channel capacity 200 of the four downstream channels being more close to the sum capacity requirement of the six broadcast television programs that the four channels carry. However, it should be noted that, given the increase in the number of broadcast television programs now carried by the four, bonded downstream channels, it may be possible for the four bonded downstream channels to carry even a seventh broadcast television program because of a statistical multiplexing gain over the single channel case.

In general, statistical multiplexing takes advantage of the fact that not all of the broadcast television programs will contain complex scenes that require large amounts of bandwidth. A statistical multiplexer can use information about the complexity of the scenes in each broadcast television program to determine how much bandwidth should be allocated to each broadcast and shape the bit rates of the broadcasts accordingly, thereby freeing up space for other, potential broadcast television programs to be inserted into the bonded group of downstream channels. In general, the more broadcast television programs within a downstream channel (or within a logical channel formed from a bonded group of downstream channels), the larger the statistical multiplexing gain will be for that downstream channel.

It should be noted that each broadcast television program transmitted over a bonded group of downstream channels is generally dispersed, in part, over each downstream channel in the bonded group. For example, this may be the case in order to balance the combined load of all the broadcast television programs across the downstream channels in the bonded group. As a result, a receiver (e.g., a set-top box) needs to be able to simultaneously or concurrently downconvert, demodulate, and decompress each downstream channel in a bonded group of downstream channels in order to recover one or more of the broadcast television programs carried over the bonded group of downstream channels.

To further increase packing densities and/or reduce wasted channel capacity, the bonded channel capacity of a bonded group of downstream channels can be increased by increasing the number of downstream channels in the bonded group. For example, bonded channel capacity 200 in FIG. 2 can be increased by increasing the number of downstream channels in the bonded group from four to five or more. The problem with such an approach is that a receiver (e.g., a set-top box) of the television programs broadcasted over the bonded group of downstream channels needs to be able to simultaneously or concurrently downconvert, demodulate, and decompress each channel in the bonded group of downstream channels given that each broadcasted television program can be dispersed, in part, over each downstream channel in the bonded group.

Thus, such an approach would require increasingly complex and expensive receivers, while at the same time make a potentially large number of legacy receivers with limited capabilities in terms of the number of downstream channels they are able to simultaneously or concurrently downconvert, demodulate, and decompress obsolete. For example, in cable networks operated in accordance with the Data Over Cable Services Interface Specification (DOCSIS™), many of the legacy cable modems and set-top boxes currently operating in these networks are only able to simultaneously downconvert, demodulate, and decompress four downstream channels.

The present disclosure is directed to a system and method for creating overlapping bonded groups of downstream channels that can provide increased channel capacity to improve packing densities, while at the same time limiting complexity and cost increases of new receivers and allowing the continued operation of many legacy receivers. These and other features of the present disclosure are described further below in regard to FIGS. 3-5.

Figure 3:
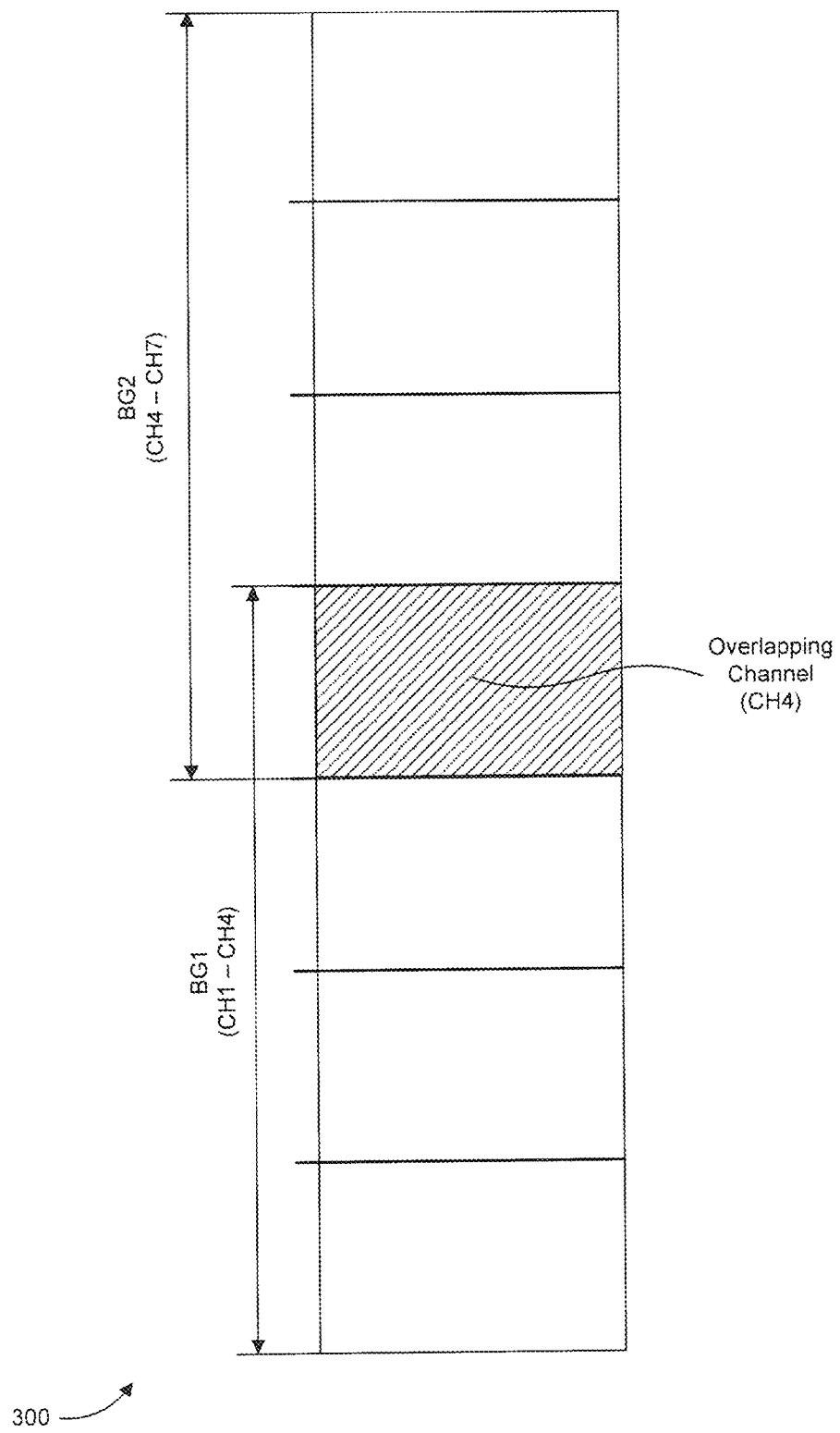
FIG. 3 illustrates an example of two bonded groups of channels that share a channel in accordance with embodiments of the present disclosure.

2. System and Method for Efficient Digital Video Transmission Using Overlapping Bonded Groups of Channels FIG. 3 illustrates an example of such overlapping bonded groups of downstream channels in accordance with embodiments of the present disclosure. In particular, FIG. 3 illustrates a first bonded group (BG1) of four downstream channels (CH1-CH4) that have been bonded together and a second bonded group (BG2) of four downstream channels (CH4-CH7) that have been bonded together. As can be seen from FIG. 3, downstream channel CH4 is shared between bonded group BG1 and bonded group BG2, creating overlap.

The shared channel CH4 between the bonded group BG1 and the bonded group BG2 allows each of the bonded groups to effectively use the unused capacity of the other bonded group when available. In other words, the shared channel CH4 between the bonded group BG1 and the bonded group BG2 provides for a greater statistical multiplexing gain that can lead to increased packing densities of the bonded groups. For example, assuming each channel in FIG. 3 has a similar bandwidth and capacity as the four bonded channels described above in regard to FIG. 2, the seven channels of the bonded groups BG1 and BG2 may be able to carry twice as many broadcast television channels as the four bonded channels described above in FIG. 3 using less than twice the bandwidth.

In one embodiment, the system and method of the present disclosure can disperse the broadcast television programs carried by each bonded group BG1 and BG2 such that all or a majority of any unused capacity of the bonded group is within the downstream channel CH4 shared between the two bonded groups. In this way, the other bonded group can utilize the unused capacity.

It should be noted that more than one downstream channel can be shared between the two bonded groups BG1 and BG2 and that the shared channels (or even the channels within each bonded group BG1 and BG2) do not have to be contiguous in frequency (i.e., directly adjacent in frequency). It should be further noted that either or both of the bonded groups BG1 and BG2 can share one or more of their remaining channels with other bonded groups of downstream channels. For example, a third bonded group BG3 (not shown) of four downstream channels CH7-CH10 can be used, with CH7 overlapping with bonded group BG2. Finally, it should be noted that each bonded group BG1 and BG2 can include more or less downstream channels than the four downstream channels shown in FIG. 3. For example, bonded groups BG1 and BG2 can each include eight downstream channels in other embodiments.

Figure 4:
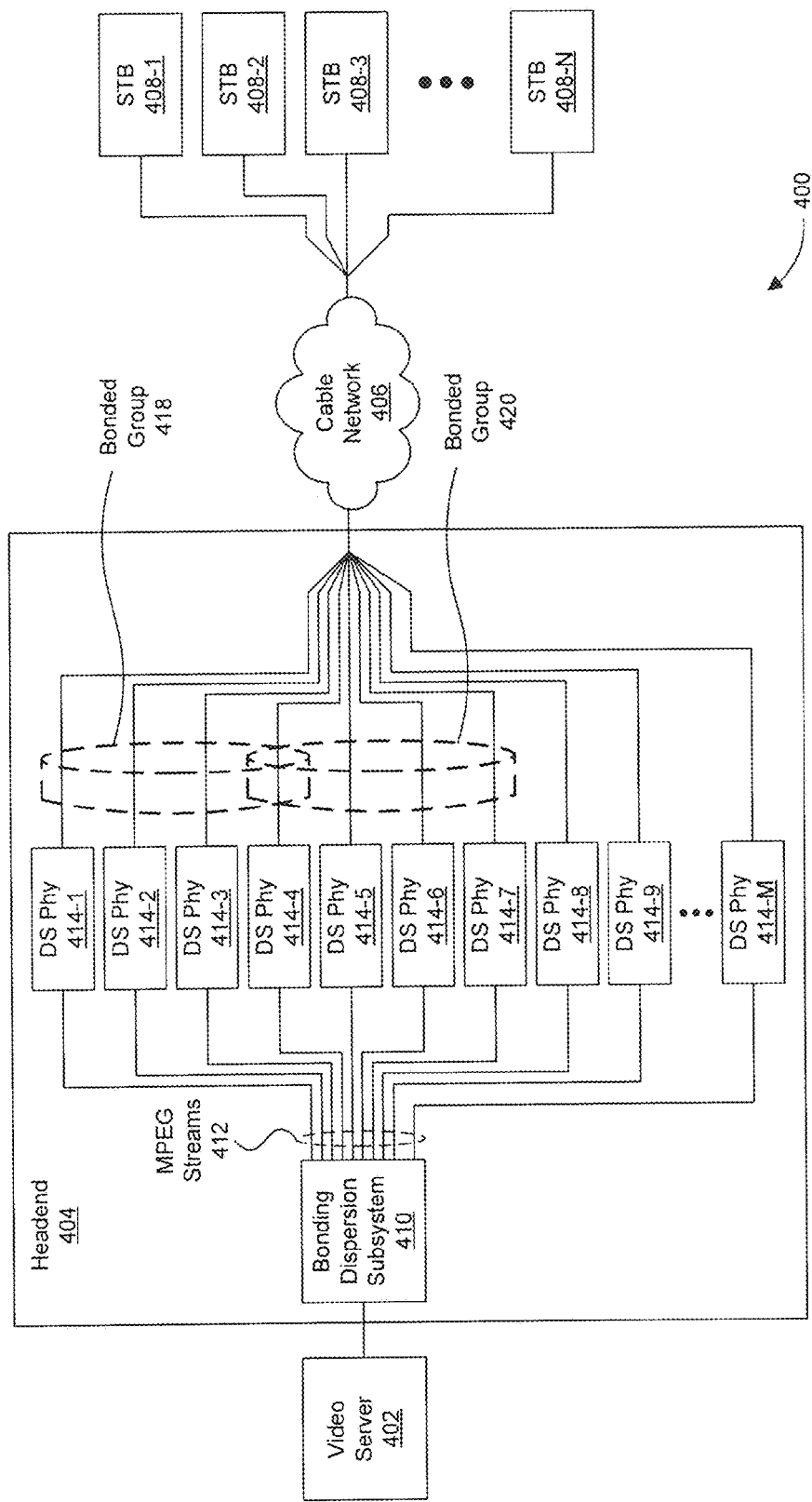
FIG. 4 illustrates an example cable network for digital video distribution in accordance with embodiments of the present disclosure.

Referring now to FIG. 4, an exemplary cable network video distribution system 400 is illustrated in accordance with embodiments of the present disclosure. Cable network video distribution system 400 is a communication system that distributes broadcast television programs and other programs (e.g., video-on demand) and data to subscribers. As shown in FIG. 4, cable network video distribution system 400 includes four parts: a video server 402, a headend 404, a cable network 406, and a plurality of cable modems or set-top boxes (STBs) 408-1 through 408-N.

Headend 404 receives incoming broadcast television programs from video server 402. The broadcast television programs can be formatted, for example, in accordance with a SDTV format, a HDTV format, and/or an UHDTV format, such as 4K UHDTV or 8K UHDTV. Headend 404 includes a bonding dispersion subsystem 410 that compresses (or encodes) the broadcast television programs (which can include audio and video data) received from video server 402 using, for example, a Moving Picture Expert Group (MPEG) compression scheme, such as HEVC or H.256. The compressed broadcast television programs are referred to as MPEG streams 412 and each typically corresponds to a different broadcast television program.

Bonding dispersion subsystem 410 subsequently disperses MPEG streams 412 to a plurality of downstream physical layer modulators (DS PHYs) 414-1 through 414-M. Each DS PHY 414 modulates the symbols of the one or more MPEG streams it receives and up-converts the modulated symbols to RF for transmission over a particular downstream channel. DS PHYs 414-1 through 414-M can use, for example, 64-QAM, 128-QAM, 256-QAM, 1024-QAM, or 4096-QAM to modulate the symbols.

Bonding dispersion subsystem 410 is configured to form a first bonded group of downstream channels 418 and a second bonded group of downstream channels 420, and disperse a first set of MPEG streams from MPEG streams 412 over the first bonded group of downstream channels and a second set of MPEG streams from MPEG streams 412 over the second bonded group of downstream channels. The first set of MPEG streams can be assigned to the first bonded group of downstream channels by bonding dispersion subsystem 410, and the second set of MPEG streams can be assigned to the second bonded group of downstream channels by bonding dispersion subsystem 410. These assignments can be signaled to STBs 408-1 through 408-N over cable network 406.

As shown in FIG. 4, DS PHYs 414-1 through 414-4 correspond to the downstream channels in the first bonded group 418 of downstream channels, and DS PHYs 414-4 through 414-7 correspond to the downstream channels in the second bonded group 420 of downstream channels. The downstream channel corresponding to DS PHY 414-4 is shared between the two bonded groups to improve the packing density of the bonded groups as described above in regard to FIG. 3. Because the downstream channel corresponding to DS PHY 414-4 is shared between the two bonded groups, the shared downstream channel can carry MPEG streams from both the first set of MPEG streams and the second set of MPEG streams. For example, the shared downstream channel can simultaneously or at different times carry MPEG streams from both the first set of MPEG streams and the second set of MPEG streams.

In one embodiment, bonding dispersion subsystem 410 can be configured to disperse the first set of MPEG streams over the first bonded group of downstream channels and the second set of MPEG streams over the second bonded group of downstream channels such that all or a majority of any unused capacity of each bonded group of downstream channels is within the downstream channel shared between the two bonded groups. In this way, the other bonded group can utilize the unused capacity.

Cable network 406 includes coaxial and/or fiber optic cables and couples headend 404 to STBs 408-1 through 408-N. A STB 408 can recover a broadcast television program carried over a bonded group, such as bonded group 418 or 420, by simultaneously or concurrently down-converting, demodulating, and decompressing the signal received over each channel in the bonded group. There is no need for a STB 408 to be capable of simultaneously or concurrently down-converting, demodulating, and decompressing the signals received over each channel in both sets of bonded groups 418 and 420.

It should be noted that more than one downstream channel can be shared between the two bonded groups 418 and 420 and that the shared channels do not have to be contiguous in frequency (i.e., directly adjacent in frequency). It should be further noted that either or both of the bonded groups 418 and 420 can share one or more of their remaining channels with other bonded groups of channels and that each bonded group 418 and 420 can include more or less downstream channels than four downstream channels. For example, bonded groups 418 and 420 can each include eight downstream channels in other embodiments. Finally, it should be noted that each bonded group 418 and 420 can carry non-broadcast programs over its downstream channels, such as a video on-demand program, a unicast program, or a data service.

Figure 5:
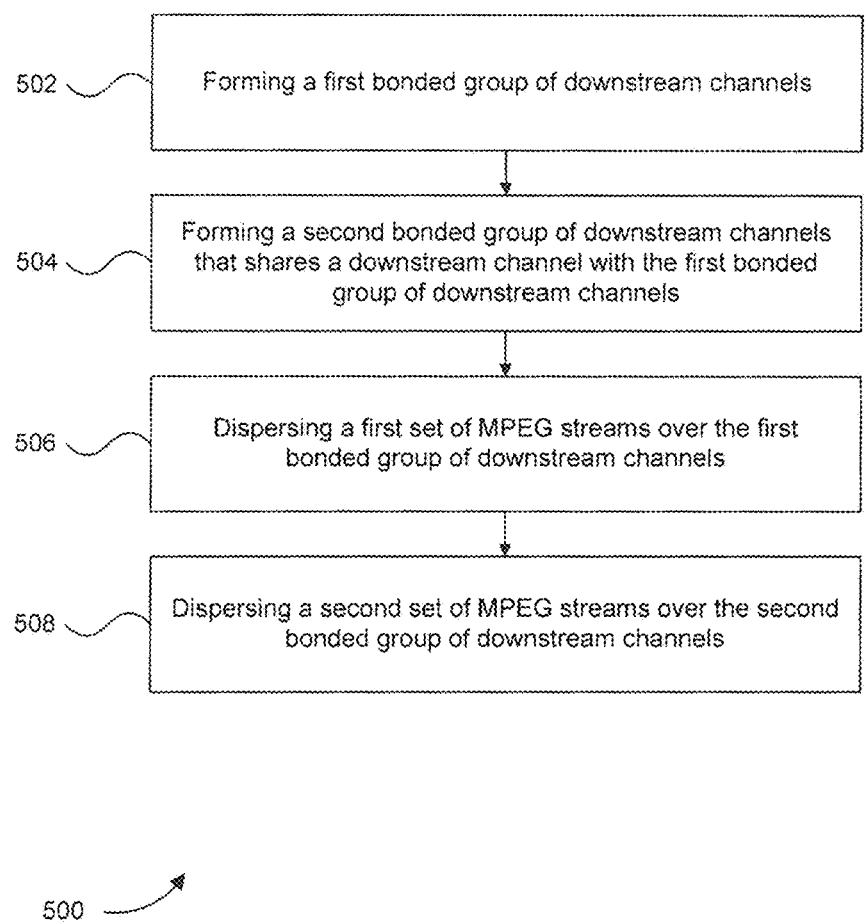
FIG. 5 illustrates a flowchart of an example method for efficient distribution of digital video over a network in accordance with embodiments of the present disclosure.

Referring now to FIG. 5, a flowchart 500 of a method for efficient distribution of digital video over a cable network is illustrated in accordance with embodiments of the present disclosure. The method of flowchart 500 can be implemented by headend 404 in FIG. 4. However, as will be appreciated by one of ordinary skill in the art, the method of flowchart 500 can be implemented by other systems.

The method of flowchart 500 begins at step 502. At step 502, a first bonded group of downstream channels is formed. For example, bonding dispersion subsystem 410 in FIG. 4 can form the first bonded group of downstream channels and signal to STBs 408-1 through 408-N the downstream channels included in the first bonded group of downstream channels.

At step 504, a second group of downstream channels that shares a downstream channel with the first bonded group of downstream channels is formed. Similar to the first bonding group, bonding dispersion subsystem 410 in FIG. 4 can form the second bonded group of downstream channels and signal to STBs 408-1 through 408-N the downstream channels included in the second bonded group of downstream channels. As illustrated in FIG. 3 and discussed above, one or more channels can be shared between the first bonded group and the second bonded group. The shared channel allows each of the bonded groups to effectively use the unused capacity of the other bonded group if available.

At step 506, a first set of MPEG streams are dispersed over the first bonded group of downstream channels using, for example, bonding dispersion subsystem 410 in FIG. 4.

At step 508, a second set of MPEG streams (each of which can be different from the first set of MPEG streams) are dispersed over the second bonded group of downstream channels again using, for example, bonding dispersion subsystem 410 in FIG. 4.

3. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
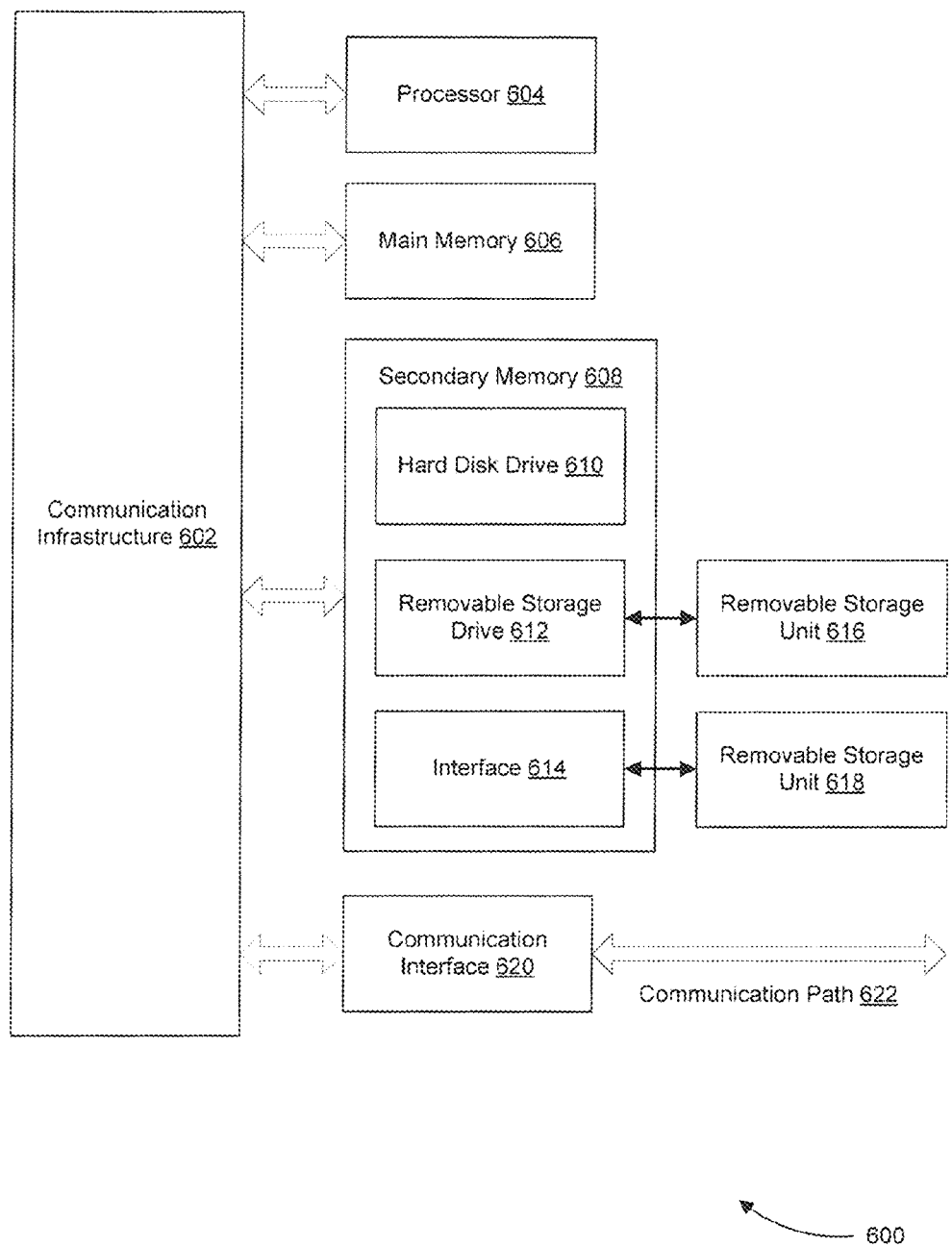
FIG. 6 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. Blocks depicted in FIG. 4 may execute on one or more computer systems 600. Furthermore, each of the steps of the methods depicted in FIG. 5 can be implemented on one or more computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

4. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system, comprising:
 a bonding dispersion subsystem, implemented at least in part in hardware, configured to: form a first bonded group of downstream channels and a second bonded group of downstream channels, and disperse a first set of streams over the first bonded group of downstream channels and a second set of streams over the second bonded group of downstream channels; and a plurality of downstream physical layer modulators (DS PHYs) configured to modulate symbols of the first set of streams for transmission over the first bonded group of downstream channels and modulate symbols of the second set of streams for transmission over the second bonded group of downstream channels, wherein a first shared downstream channel is shared between the first bonded group of downstream channels and the second bonded group of downstream channels, wherein the bonding dispersion subsystem is further configured to disperse both the first set of streams over the first bonded group of downstream channels and the second set of streams over the second bonded group of downstream channels such that a majority of any unused capacity of the first and second bonded groups is within the first shared downstream channel.

2. The system of claim 1, wherein the plurality of DS PHYs comprise:
   a first set of DS PHYs configured to modulate the symbols of the first set of streams for transmission over the first bonded group of downstream channels; and
   a second set of DS PHYs configured to modulate the symbols of the second set of streams for transmission over the second bonded group of downstream channels,
   wherein one of the plurality of DS PHYs is shared between the first set of DS PHYs and the second set of DS PHYs and is configured to modulate symbols of both the first set of streams and the second set of streams for transmission over the first shared downstream channel.

3. The system of claim 1, where in the first set of streams includes video data, and wherein the second set of streams includes video data.

4. The system of claim 3, wherein the video data of the first set of streams is formatted in accordance with an ultra-high definition television format, and wherein the video data of the second set of streams is formatted in accordance with the ultra-high definition television format.

5. The system of claim 1, wherein the first set of streams are motion picture experts group (MPEG) streams that comprise audio and video data.

6. The system of claim 1, wherein the first bonded group of downstream channels consists of a first set of four downstream channels and the second bonded group of downstream channels consists of a second set of four downstream channels.

7. The system of claim 1, wherein the bonding dispersion subsystem is further configured to
   form a third bonded group of downstream channels, wherein the third bonded group of downstream channels comprises a second shared downstream channel that is shared with the second bonded group of downstream channels.

8. The system of claim 1, wherein the first shared downstream channel allows the first bonded group of downstream channels to utilize unused capacity of the second bonded group of downstream channels.

9. A system, comprising:
   a bonding dispersion subsystem, implemented at least in part in hardware, configured to: form a first bonded group of downstream channels and a second bonded group of downstream channels, and disperse a first set of motion picture experts group (MPEG) streams over the first bonded group of downstream channels and a second set of MPEG streams over the second bonded group of downstream channels; and a plurality of downstream physical layer modulators (DS PHYs) configured to modulate symbols of the first set of MPEG streams for transmission over the first bonded group of downstream channels and modulate symbols of the second set of MPEG streams for transmission over the second bonded group of downstream channels, wherein a first shared downstream channel is shared between the first bonded group of downstream channels and the second bonded group of downstream channels, wherein video data included in each of the first set of MPEG streams is formatted in accordance with an ultra-high definition television format and video data included in each of the second set of MPEG streams is formatted in accordance with the ultra-high definition television format, wherein the bonding dispersion subsystem is further configured to disperse both the first set of MPEG streams over the first bonded group of downstream channels and the second set of MPEG streams over the second bonded group of downstream channels such that a majority of any unused capacity of the first and second bonded groups is within the first shared downstream channel.

10. The system of claim 9, wherein the plurality of DS PHYs comprises:
    a first set of DS PHYs configured to modulate the symbols of the first set of MPEG streams for transmission over the first bonded group of downstream channels; and
    a second set of DS PHYs configured to modulate the symbols of the second set of MPEG streams for transmission over the second bonded group of downstream channels,
    wherein one of the plurality of DS PHYs is shared between the first set of DS PHYs and the second set of DS PHYs and is configured to modulate symbols of both the first set of MPEG streams and the second set of MPEG streams for transmission over the first shared downstream channel.

11. The system of claim 9, wherein the first bonded group of downstream channels consists of a first set of four downstream channels and the second bonded group of downstream channels consists of a second set of four downstream channels.

12. The system of claim 11, wherein the first set of MPEG streams consists of four MPEG streams and the second set of MPEG streams consists of four MPEG streams.

13. The system of claim 12, wherein each MPEG stream in the first set of MPEG streams is different from each MPEG stream in the second set of MPEG streams.

14. The system of claim 9, wherein the bonding dispersion subsystem is further configured to:
    form a third bonded group of downstream channels, wherein the third bonded group of downstream channels comprises a second shared downstream channel that is shared with the second bonded group of downstream channels.

15. A method, comprising:
    forming a first bonded group of downstream channels;
    forming a second bonded group of downstream channels, wherein a first shared downstream channel is shared between the first bonded group of downstream channels and the second bonded group of downstream channels;
    dispersing a first set of streams over the first bonded group of downstream channels such that a majority of any unused capacity of the first bonded group of downstream channels is within the first shared downstream channel; and dispersing a second set of streams over the second bonded group of downstream channels such that a majority of any unused capacity of the second bonded group of downstream channels is within the first shared downstream channel.

16. The method of claim 15, wherein the first set of streams includes video data, and wherein the second set of streams includes video data.

17. The method of claim 16, wherein the video data of the first set of streams is formatted in accordance with an ultra-high definition television format, and wherein the video data of the second set of streams is formatted in accordance with the ultra-high definition television format.

18. The method of claim 15, wherein the first set of streams are motion picture experts group (MPEG) streams that each comprise video data formatted in accordance with an ultra-high definition television format.

19. The method of claim 15, wherein the first bonded group of downstream channels consists of a first set of four downstream channels and the second bonded group of downstream channels consists of a second set of four downstream channels.

20. The method of claim 15, further comprising:
forming a third bonded group of downstream channels, wherein the third bonded group of downstream channels comprises a second shared downstream channel that is shared with the second bonded group of downstream channels.

* * * * *